May 25, 1965 S. D. SUTTON 3,185,751
MANUFACTURE OF LATICES, DISPERSIONS AND COMPOUNDS OF
POLYMERIC ORGANIC MATERIALS CONTAINING METAL
Filed Dec. 11, 1961
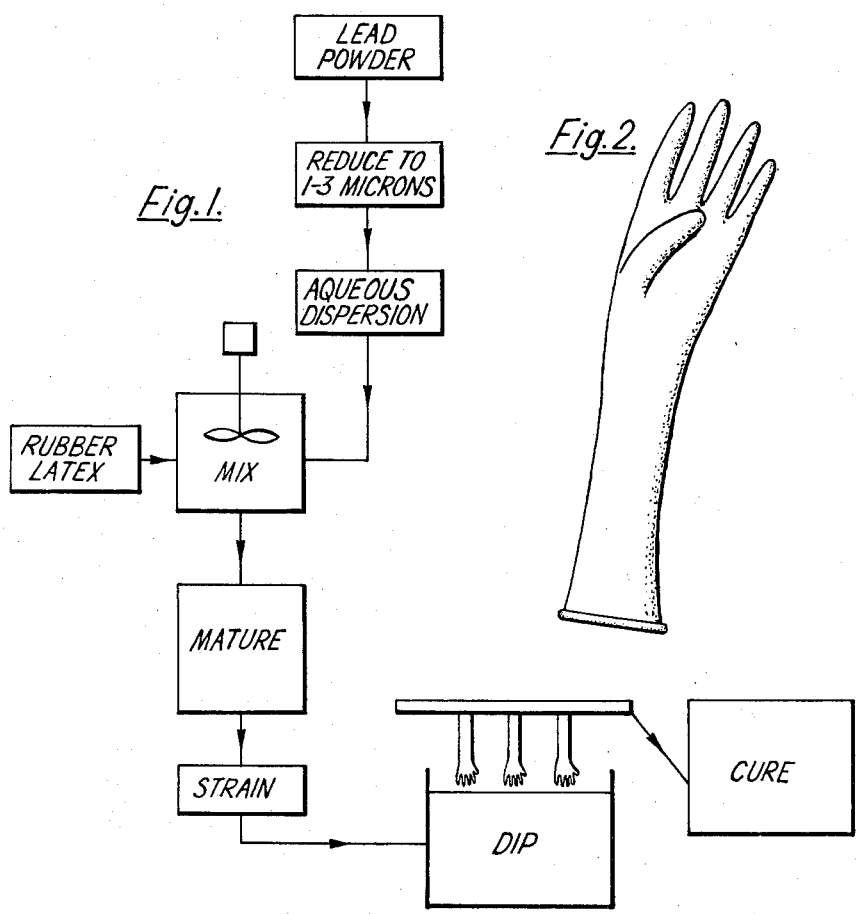
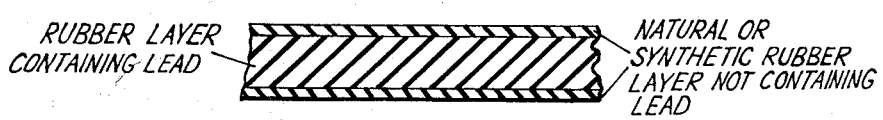
Inventor
Sidney David Sutton
By Webb,
Mackey, Burden
Attorney

3,185,751
MANUFACTURE OF LATICES, DISPERSIONS AND COMPOUNDS OF POLYMERIC ORGANIC MATERIALS CONTAINING METAL
Sidney David Sutton, Slough, England, assignor to Veedip Limited, Slough, England, a British company
Filed Dec. 11, 1961, Ser. No. 158,240
Claims priority, application Great Britain, Mar. 7, 1961, 8,280/61
20 Claims. (Cl. 264—301)

This invention relates to a method of compounding natural rubber latex and certain latices and dispersions of synthetic rubber and plastics, solid compounds made from the latices and dispersions and articles consisting of or incorporating such compounds. The dispersions and latices to which the invention relates have the characteristic that the particles exhibit Brownian movement and they include, in addition to natural rubber latex (which term includes prevulcanised or post-vulcanised natural rubber latex), synthetic rubber latices, synthetic rubber dispersions and dispersion of synthetic organic polymeric materials ("plastics"), for example polyvinyl chloride, polymethylmethacrylate and polyvinyl alcohol. For convenience the dispersions and latices to which the invention relates will hereinafter be referred to generically as "latex" or "latices."

An object of the invention is to provide a method of incorporating relatively large quantities of a heavy metal, especially metallic lead, into latices, and methods of making flexible compounds and articles from such compounded latices.

In accordance with the invention a method of incorporating heavy metal with high specific gravity into a latex (as hereinbefore defined) comprises reducing the metal to a particle size comparable with or less than that of the particle size of the liquid or solid polymeric material in the latex, preparing an aqueous dispersion of the metal particles, with or without the use of a dispersing agent of the kind used in the compounding of the latices, mixing the metal dispersion with the latex, allowing the mixture to mature until it becomes stable and then, if necessary, straining it. It may be strained, for example, directly into a storage container or a dipping tank. If the latex is not already sufficiently stabilised to prevent coagulation when the metal dispersion is added, we add to the metal dispersion or to the latex, preferably to the latex, a stabilising agent, a suitable stabilising agent being, for example, a polyethylene oxide condensation product.

The term "heavy metal having a high specific gravity" as used herein means a metal having a specific gravity not substantially less than 8, e.g. iron and higher specific gravity metals.

The term "having a particle size comparable with" as used herein means of an average particle size not substantially more than double that of the latex (i.e.: a particle size of less than 6 microns) and not containing a substantial proportion of particles in the upper part of the size range substantially more than twice the diameter of the equivalent upper part of the particle size range of the latex.

When we refer to the compound becoming stable we mean that it no longer shows any substantial change in viscosity and is substantially free from entrapped air. The time to reach the desired stability will vary in accordance with the use to which the compound is to be put. When it is to be used for forming hollow articles by a dipping process a high degree of freedom from air is necessary (to avoid blow holes in the articles) and constant viscosity is desirable so that the same number of dips always result in a coating of the same thickness. We have found a maturing period of four days to be adequate for this degree of stability to be attained.

The invention is especially concerned with the incorporation of lead into latex and will hereinafter be described in this aspect, with reference to the accompanying drawings in which FIGURE 1 is a flow diagram illustrating the incorporation of lead into latex and the use of the latex in the manufacture of rubber articles by dipping, FIGURE 2 is a gauntlet made by the process of FIGURE 1 and consisting of a layer of 46 thousandths of an inch thick of rubber throughout which is substantially evenly dispersed five times the weight of the rubber of lead particles of an average size of 2 microns and a size range of 1–3 microns and inner and outer layers each 2 thousandths of an inch thick of polychloroprene not containing lead, and FIGURE 3 is a representative section through part of an article (such as the gauntlet of FIGURE 2) or a sheet material made by a process in accordance with the invention.

In FIGURE 1 the formers are shown (for simplicity) as being dipped in only one tank (marked "dip"). In fact, as will hereinafter be described, they are preferably first dipped in a latex not containing lead (to form one of the surface layers shown in FIGURE 3) then dipped a number of times in the latex containing lead and finally again in the latex not containing lead to form the other surface layer shown in FIGURE 3.

We have found that when the lead is reduced to such a fine particle size, an aqueous dispersion of the lead can be prepared without the use of a dispersing agent. When a dispersing agent is necessary a suitable dispersing agent is sulphonated naphthalene. The particle size of the lead is preferably reduced either by grinding the lead in a colloid mill or a ball mill or attritor or by atomising the lead by a spraying process. We prefer to reduce the lead to as fine a particle size as possible and preferably to an average particle size equal to or less than that of the latex e.g. until substantially all of the particles are of a diameter less than 3 microns and the average particle size is 2 microns, when natural rubber latex is used.

After mixing, the compounded latex containing the lead is found to have a low viscosity but during the maturing period the compounded latex becomes thioxtropic and practically no lead settles out. The thixotropy is slight and does not impede dipping of formers.

We believe that by evenly dispersing the small lead particles in the latex, the rubber or synthetic polymeric particles, which are of lower specific gravity than the supporting fluid and are in Brownian movement, are enabled to support the higher specific gravity lead particles, provided that the dry lead content by volume does not substantially exceed the dry rubber content by volume. For example natural rubber latex has a specific gravity of about 0.98, the rubber particles in Brownian movement having a specific gravity of about 0.92, assuming a normal commercial concentration of 50%–60% solids. We believe that the suspension value of the rubber particles when in Brownian movement enables the rubber to support the lead particles in spite of the fact that the lead has a specific gravity of 11.3.

We have found that the matured lead/organic polymeric compound is very stable and that after six months storage it does not show any substantial drop in pH value, reduction in stability or settling out of the lead.

We prefer to use sufficient of the lead dispersion to give the compound a higher lead content by weight than its content of organic polymeric material but we prefer that the lead content by volume should not substantially exceed the content by volume of the organic polymeric material of the latex. When using natural rubber latex we prefer to use latex having a solid content of 50%–60%.

The compounded latex finds its most important application in the manufacture of articles and sheet material by dipping using the various methods known i.e. straight dipping, coagulant dipping, acid setting and heat sensitised processes. Material and articles, for example gauntlets, made from the compounded latices in accordance with the invention are useful as protection against moderate energy radiation, for example gauntlets made from the compounded latices can be fitted to portholes in dry boxes to enable operators to handle radioactive materials in solid form or in solvents, as a protection for the wearer against radio-active dust and against irradiation from the materials being handled. Gauntlets made from the compounds in accordance with the invention provide a greater protection, especially against beta and gamma radiation, than rubber and plastic gauntlets at present in use.

In manufacturing such gauntlets and other hollow articles, to provide an inner layer protecting the user against the toxic or other harmful effects of lead, we prefer to coat a former by dipping it first in a latex or dispersion of an organic polymeric material not containing lead. An appropriate thickness of the material containing the lead is then built up on the coated former by successive dipping in the compounded latex containing lead. When the required thickness has been attained, we prefer to apply an outer coating of an organic polymeric material, e.g. natural rubber, polychloroprene, polyacrylonitrile or butyl rubber, not containing lead as a further protection, during handling of the articles against the toxic or other harmful effects of the lead. Another reason why we prefer to apply an outer coating of polymeric material not containing lead is that such coatings protect the lead when the articles are brought into contact with compounds, such as inorganic and organic acids, that have a deleterious effect on lead. Similarly contamination of such compounds by the lead is inhibited.

We have found it possible by this process to build up a gauntlet of a thickness of approximately 50 thousandths of an inch, of which 46 thousandths is of the lead containing compound, which has sufficient flexibility to enable the wearer to pick up small articles with the fingers and to operate delicate apparatus and at the same time provides the required protection against radiation. When gloves or gauntlets are made without an inner lead free layer, from the compounded latices, they can be worn over an inner protective glove or gauntlet of a rubber or a plastic or a fabric. A further alternative is to fit a fabric lining for the glove onto the former before dipping in the lead compound.

Other shaped articles and sheet material can be made by dipping, casting or spreading from the compounded latices in accordance with the invention, especially for use as protection against all forms of radiation, including X-rays beta and moderate gamma radiation, where lead protection has been found to be necessary. In all cases we prefer that the lead containing layer should have a protective covering, not containing lead, on both sides.

Sheet material can be made for example by spreading the compounded latices in accordance with the invention onto fabric and applying to the coating thus formed a protective layer of an organic polymeric material not containing metallic lead. Self supporting sheets, with or without a protective covering layer or layers not containing lead, may be made by spreading the compounded latices on a support treated to prevent adhesion and subsequently stripping the lead containing sheet thus formed.

The composition of compounded latices made in accordance with the invention suitable for making gloves and gauntlets and methods of preparing such latices will hereinafter be described by way of example.

Two preferred compositions are as follows:

*Example 1*

| | Parts (dry wt.) |
|---|---|
| Natural rubber latex (58% D.R.C. by weight) (pre-vulcanised) | 100 |
| Lead dispersion (88% solids by weight) | 500 |
| Antioxidant (2,2'-methylene-bis(4-methyl) 6-tertiary butyl phenol) | 1 |
| Stabilising agent (polyethylene oxide condensation product) | 1 |

*Example 2*

| | Parts (dry wt.) |
|---|---|
| Polychloroprene latex (50% solids by weight) | 100 |
| Lead dispersion (88% solids by weight) | 500 |
| Antioxidant (phenyl beta naphthylamine) | 2 |
| Stabilising agent (polyethylene oxide condensation product) | 1 |

These dispersions are prepared in the following way. An aqueous dispersion of lead with a solid content by weight of 88% is first prepared.

One method of preparing the lead dispersion is to grind finely divided lead powder in a ball mill with water and a dispersing agent until the particle size of the lead is about 1 to 2 microns. This may take as long as 48 hours. An alternative method is to spray finely divided lead powder into water by means of a metal spray gun. Dry metal powder can be sprayed directly into water. If during either process partial settlement of the lead occurs water is removed until the solid content is 88% by weight.

The lead dispersion is preferably incorporated immediately into the latex to avoid the risk that the lead will settle out and redispersion will be necessary.

Suitable quantities of latex and lead dispersion are weighed out to make up the compound of Example 1 or Example 2, the lead dispersion being continuously stirred to keep the lead in uniform dispersion and the latex also being stirred prior to and during the mixing operation.

The lead dispersion is then added to the latex and the mixture stirred for at least 5 and preferably 10 minutes after all of the lead has been added, before being transferred into storage drums. The latex compound containing the lead is allowed to mature 4 to 7 days, during which time air escapes from the compound and it becomes stable and thioxotropic, and after which it can be used for manufacturing flexible articles by any conventional process such as dipping, spreading or slush moulding.

When it is to be used in the dipping process it is strained into a dipping vat, allowed to stand for a few hours and the used for the manufacture of hollow articles by dipping formers into the compound.

The flexible rubber compound containing lead obtained from a compounded dispersion having the composition of Example 1 has a half thickness to beta-radiation almost identical with that of aluminium and hence shielding efficiencies against known beta-radiation energies can be computed from published data for aluminium.

In practice the compound is found to have a better overall shielding effect than the same thickness of aluminium.

What I claim as my invention is:

1. A method of incorporating a heavy metal having a high specific gravity into a latex to form a stable compounded latex in liquid form which comprises preparing a liquid aqueous dispersion of the metal of a particle size of less than 6 microns, mixing the dispersion with the latex and allowing the mixture to mature until it becomes stable, the concentration and quantity of the metal dispersion added to the latex being such that the resultant compounded latex has a higher metal content by weight than its content of organic polymeric material.

2. A method of incorporating metallic lead into a latex to form a stable compounded latex in liquid form which comprises preparing a liquid aqueous dispersion of lead of a particle size of less than 6 microns mixing the dispersion with the latex and allowing the mixture to mature until it becomes stable, the concentration and quantity of the lead dispersion added to the latex being such that the resultant compounded latex has a higher lead content by weight than its content of organic polymeric material.

3. A method of incorporating metallic lead into a natural rubber latex to form a stable compounded latex in liquid form which comprises preparing a liquid aqueous dispersion of lead of a particle size of less than 6 microns, mixing the dispersion with the latex and allowing the mixture to mature until it becomes stable, the concentration and quantity of the lead dispersion added to the latex being such that the resultant compounded latex has a higher lead content by weight than its content of rubber.

4. A method of incorporating metallic lead into a latex to form a stable compounded latex in liquid form which comprises preparing a liquid aqueous dispersion of lead of a particle size of less than 6 microns, mixing the dispersion with the latex and allowing the mixture to mature until it becomes stable, the concentration and quantity of the lead dispersion added to the latex being such that the resultant compounded latex has a higher lead content by weight than its content of organic polymeric material and a lead content by volume not exceeding that of the organic polymeric material.

5. A method of incorporating metallic lead into a natural rubber latex to form a stable compounded latex in liquid form which comprises preparing a liquid aqueous dispersion of lead of a particle size of less than 6 microns, mixing the dispersion with the latex and allowing the mixture to mature until it becomes thixotropic, the concentration and quantity of the lead dispersion added to the latex being such that the resultant compounded latex has a higher lead content by weight than its content of rubber and a lead content by volume not exceeding that of the rubber.

6. A method of manufacturing a flexible article or material containing a high proportion of a heavy metal having a high specific gravity from a latex which comprises preparing a liquid aqueous dispersion of the metal of a particle size of less than 6 microns, mixing the dispersion with the latex to form a compounded latex in liquid form, allowing the mixture to mature until it becomes stable and then depositing a solid flexible compound from the latex, the concentration and quantity of the metal dispersion added to the latex being such that the resultant flexible compound has a higher metal content by weight than its content of organic polymeric material.

7. A method of manufacturing a flexible article or material containing a high proportion of lead from a latex which comprises preparing a liquid aqueous dispersion of lead of a particle size of less than 6 microns, mixing the dispersion with the latex to form a compounded latex in liquid form, allowing the mixture to mature until it becomes stable and then depositing a solid flexible compound from the latex, the concentration and quantity of the lead dispersion being such that the resultant flexible compound has a higher lead content by weight than its content of organic polymeric material.

8. A method of manufacturing a flexible rubber article or material containing a high proportion of lead from a natural rubber latex which comprises preparing a liquid aqueous dispersion of lead of a particle size of less than 6 microns, mixing the dispersion with the latex to form a compounded latex in liquid form, allowing the mixture to mature until it becomes stable and then depositing a solid flexible rubber compound from the latex, the concentration and quantity of the lead dispersion added to the latex being such that the resultant flexible compound has a higher lead content by weight than its content of rubber.

9. A method of manufacturing a flexible article or material containing a high proportion of lead from a latex which comprises preparing a liquid aqueous dispersion of lead of a particle size of less than 6 microns, mixing the dispersion with the latex to form a compounded latex in liquid form allowing the mixture to mature until it becomes stable and then depositing a solid flexible compound from the latex, the concentration and quantity of the lead dispersion added to the latex being such that the resultant solid material has a higher lead content by weight than its content of organic polymeric material and a lead content by volume not exceeding that of the organic polymeric material.

10. A method of manufacturing a flexible rubber article or material containing a high proportion of lead from a natural rubber latex which comprises preparing a liquid aqueous dispersion of lead of a particle size of less than 6 microns, mixing the dispersion with the latex to form a compounded latex in liquid form, allowing the mixture to mature until it becomes stable and then depositing a solid flexible rubber compound from the latex, the concentration and quantity of the lead dispersion added to the latex being such that the resultant solid material has a higher lead content by weight than is content of organic rubber and a lead content by volume not exceeding that of the organic rubber.

11. A method of manufacturing an article, as claimed in claim 6, in which the article is formed by a process involving dipping a shaped former in the compounded latex to deposit a layer of the organic polymeric material containing lead on the former.

12. A method of manufacturing an article, as claimed in claim 7, in which the article is formed by a process involving dipping a shaped former in the compounded latex to deposit a layer of the organic polymeric material containing lead on the former.

13. A method as claimed in claim 12 in which prior to dipping in the compound latex containing lead the former is dipped in a latex not containing lead to deposit a layer of organic polymeric material not containing lead thereon.

14. A method as claimed in claim 12 in which after dipping in the compounded latex containing lead the former is dipped in a latex not containing lead to deposit a layer of organic polymeric material not containing lead over the layer containing lead.

15. A method of incorporating metallic lead into a latex which comprises preparing a liquid aqueous dispersion of lead of a particle size of less than 6 microns, mixing the dispersion with the latex to form a compounded latex in liquid form having a lead content at least four times the content of polymeric material by weight and allowing the mixture to mature until it becomes stable.

16. A method as claimed in claim 15 in which the lead dispersion is added to the latex while the latter is stirred and stirring is continued for at least five minutes after all of the lead dispersion has been added.

17. A method as claimed in claim 15 in which the maturing time is at least four days.

18. A method as claimed in claim 15 in which after the lead dispersion has been prepared it is stirred continuously until added to the latex.

19. A method as claimed in claim 15 in which the lead dispersion is made by grinding a lead powder with water and a dispersing agent.

20. A method as claimed in claim 15 in which the lead dispersion is made by spraying lead into water by means of a metal spray gun.

References Cited by the Examiner

UNITED STATES PATENTS

| | | | |
|---|---|---|---|
| 1,969,242 | 8/34 | Szegvari | 252—313 |
| 2,098,710 | 11/37 | Phillippi et al. | 252—313 |
| 2,167,514 | 7/39 | Jones et al. | 260—762 |
| 2,259,457 | 10/41 | Croll | 252—313 |
| 2,714,563 | 8/55 | Poorman et al. | 117—105.1 |
| 3,025,403 | 3/62 | Belknap et al. | 250—108 |
| 3,045,121 | 7/62 | Leguillon | 250—108 |

OTHER REFERENCES

Harn, O. C.: Lead the Precious Metal, New York, The Century Co., 1924, QD 181.P3H3 (pp. 273 and 289 relied on).

EARL M. BERGERT, *Primary Examiner.*

RICHARD D. NEVIUS, *Examiner.*

UNITED STATES PATENT OFFICE
CERTIFICATE OF CORRECTION

Patent No. 3,185,751            May 25, 1965

Sidney David Sutton

It is hereby certified that error appears in the above numbered patent requiring correction and that the said Letters Patent should read as corrected below.

Column 1, line 20, for "dispersion" read -- dispersions --; column 2, line 49, for "thioxtropic" read -- thixotropic --; column 4, line 56, for "thioxotropic" read -- thixotropic --; line 61, for "the", first occurence, read -- then --.

Signed and sealed this 28th day of September 1965.

(SEAL)
Attest:

ERNEST W. SWIDER            EDWARD J. BRENNER
Attesting Officer            Commissioner of Patents